Patented Dec. 26, 1944

2,366,008

UNITED STATES PATENT OFFICE 2,366,008

PRODUCTION OF SYNTHETIC POLYMERIC COMPOSITIONS COMPRISING AMINATED POLYMERIZATES OF POLY-VINYL ARYL COMPOUNDS AND TREATMENT OF LIQUID MEDIA THEREWITH

Gaetano F. D'Alelio, Pittsfield, Mass., assignor to General Electric Company, a corporation of New York No Drawing. Application August 11, 1942,
Serial No. 454,435

17 Claims. (Cl. 210—24)

This invention relates to the production of synthetic polymeric compositions and to their use for the removal of anions from liquid media. The invention is concerned, more particularly, with compositions of matter comprising aminated, cross-linked, insoluble, infusible polymerizates of poly-vinyl aryl compounds and with their use in removing anions from liquid media, especially aqueous media.

Many natural and synthetic compositions have been proposed for removing ions from solutions. Such materials to be useful must possess the following properties:

1. They must contain either a chemical group which will react with the ion or have an activated surface which physically adsorbs the ion.
2. They must be capable of regeneration to at least part of their original activity so that they may be reused.
3. They must be insoluble in the liquid media before and after removing ions from the media. Thus, if a base were used as the treating agent it would have to be insoluble both as the base and as the salt since the base is the form before adsorbing anions and the salt is the form after adsorbing anions.

Polymeric divinyl benzene and copolymers of divinyl benzene are known. However, these polymeric bodies are not capable of removing ions from liquid media. I have now discovered that these polymeric compounds, even though they are insoluble, may be aminated. Such aminated products are very effective in removing anions from liquid media and meet all three requirements set out above.

Any suitable method may be used in preparing the polymerizates of poly-vinyl aryl compounds which are aminated to produce the compounds of my invention. For example, a poly-vinyl aryl compound may be polymerized alone or with other polymerizable compounds in the presence or absence of a solvent or a dispersion medium for the monomer or monomers by the use of heat, light, or heat and light in the presence or absence of a polymerization catalyst, at atmospheric, subatmospheric or superatmospheric pressure.

Suitable catalysts are the peroxides, e. g., benzoyl peroxide, sodium peroxide, hydrogen peroxide, acetyl benzoyl peroxide, etc.; the per-compounds, e. g., ammonium persulfate, sodium persulfate, sodium perchlorate, sodium perborate, potassium persulfate, etc.; ozone; ozonides; etc. Additional examples of polymerization catalysts that may be used are found in my U. S. Patent 2,260,005, issued October 21, 1941, and assigned to the same assignee as the present invention.

Instead of starting with monomeric materials, I may start with partially polymerized materials or with mixtures of monomeric and partially polymerized materials. Partially polymerized divinyl aryl compounds may be made by polymerizing in the presence of both an accelerator and inhibitor of polymerization. Such methods are more fully described and specifically claimed in my copending applications Serial Nos. 448,155; 448,156; 448,157; 448,158; filed June 23, 1942, and assigned to the same assignee as the present invention.

After polymerization is complete, the product is isolated if a solvent or dispersion medium is used, and ground to a granular form. The product is nitrated by the use of known nitrating agents, e. g., nitric acid, fuming nitric acid, mixed sulfuric and nitric acid, etc., and finally reduced to the corresponding amino derivative by the use of reducing agents, e. g., nascent hydrogen, stannous salts, mercurous salts, etc.

Since the amino group is the active anion-removing group in my novel polymerizates and since the amino group can only be easily introduced into an aryl nucleus I prefer that the major proportion of the polymerizate which is to be aminated, be made from polymerizable components that contain an aryl nucleus. Thus, the polymerizate may be made by: polymerizing a poly-vinyl aryl compound alone, copolymerizing a plurality of poly-vinyl aryl compounds, copolymerizing at least one poly-vinyl aryl compound with at least one mono-vinyl aryl compound, copolymerizing a mixture of polymerizable compounds, the major proportion of the polymerizable compounds being either at least one poly-vinyl aryl compound or at least one poly-vinyl aryl compound and at least one mono-vinyl aryl compound.

Illustrative examples of suitable poly-vinyl aryl compounds which may be used are:

- Divinyl benzenes
- Divinyl toluenes
- Divinyl naphthalenes
- Divinyl xylenes
- Divinyl ethyl benzenes
- Divinyl chlorobenzenes
- Divinyl-phenyl vinyl ethers Illustrative examples of suitable mono-vinyl aryl compounds which may be used are:

- Styrene (vinyl benzene)
- Vinyl toluenes
- Vinyl xylenes
- Vinyl naphthalenes
- Vinyl ethyl benzenes
- Alpha-methyl styrene
- Vinyl chlorobenzenes
- Vinyl aminobenzenes When a liquid medium having various anion impurities dissolved therein is brought in contact with these aminated, insoluble, infusible polymerizates, the anions, e. g., chloride ions, nitrate ions, sulfate ions, acetate ions, oxalate ions, etc., react with the amino groups to form salts which are also insoluble and infusible. The anions are, therefore, effectively removed from solution.

After the resin has adsorbed the anions it can readily be regenerated, for example by washing with a dilute alkali solution, preferably an alkali metal hydroxide which forms soluble salts with the adsorbed anions.

In order that those skilled in the art better may understand how the present invention is carried into effect the following illustrative examples are given, all parts being by weight.

*Example 1*

Twelve parts of a finely divided polymerizate obtained by polymerizing a mixture containing 90% styrene and 10% divinyl benzene was nitrated by reacting it with a mixture of 20 parts of nitric acid and 30 parts of concentrated sulfuric acid by heating at the reflux temperature of the mass for two hours. After washing with distilled water and breaking up any remaining lumps the above nitration procedure was repeated. The washed and dried product was reduced to the corresponding amino derivative by heating it with 23 parts of stannous chloride dihydrate and 100 parts of hydrochloric acid at the boiling temperature of the mass under reflux. The aminated polymerizate was washed with water, dilute sodium hydroxide solution and finally with distilled water.

The following examples illustrate how the aminated polymerizates of my invention may be used for adsorbing anions from liquid media.

*Example 2*

Five parts of the aminated polymerizate of Example 1 were wet with 50 parts of distilled water and then 100 parts of a standard hydrochloric acid solution were added with shaking. After standing 15 minutes the solution was filtered and the hydrochloric acid remaining in solution was determined by titrating the filtrate with standard sodium hydroxide. By this method it was found that each gram of the resin is capable of removing the chloride ions produced from 32.8 milligrams of hydrochloric acid.

*Example 3*

The exhausted resin from Example 2 was regenerated by treating it with approximately ⅓ normal sodium hydroxide. After filtering off the sodium hydroxide solution and washing well with distilled water the aminated polymerizate was retested for its ability to adsorb anions according to the method described in Example 2. Each gram of the regenerated resin was capable of removing the chloride ions produced from 23.4 milligrams of hydrochloric acid.

In any of the above examples it was impossible to detect any loss in weight of the aminated polymerizate because of the insolubility of the resin in the liquid media. This insolubility is very valuable since it allows hot solutions to be treated, whereby the rate of anion adsorption is increased.

Although in the above examples I have used aminated polymerizates prepared from the product obtained by polymerizing a mixture containing 10% of a poly-vinyl aryl compound and 90% of a mono-vinyl aryl compound, it will be understood by those skilled in the art that other proportions may be used in preparing the polymerizate to be aminated, e. g., from 5 to 100% of at least one poly-vinyl aryl compound and from 95 to 0% of at least one mono-vinyl aryl compound as has been hereinabove described.

Instead of nitrating and reducing the polymerizate of a poly-vinyl compound, I may start with a polymerizable compound or compounds containing amino groups or nitro groups, the polymerizates prepared from compounds containing nitro groups being reduced as previously described to yield the corresponding amino compound.

Also, I may include inert material such as diatomaceous earth (e. g., fuller's earth, including spent fuller's earth from petroleum refining processes), alundum, coke, silica, cinders, porous glass, etc., as a carrier for the polymerizate to increase the effective surface of the latter. This may be done by adding such carriers at any time prior to the complete polymerization of the polymerizate to the infusible, insoluble state followed by complete polymerization. In this way the carrier is surface-coated with the polymerizate. An emulsion or dispersion type of polymerization is admirably suited for coating the carrier materials since it can be carried out by adjusting the concentration and type of dispersing or emulsifying agent so as to eliminate the necessity of grinding the polymerizate before use since the product will be obtained in a finely divided state.

What I claim as new and desire to secure by Letters Patent of the United States is:

1. A water-insoluble aminated polymerizate of a poly-vinyl aryl compound.
2. A water-insoluble aminated polymerizate of a mixture comprising a poly-vinyl aryl compound and a mono-vinyl aryl compound.
3. A water-insoluble aminated polymerizate of a mixture comprising a di-vinyl aryl compound and a mono-vinyl aryl compound.
4. A water-insoluble aminated polymerizate of a mixture comprising divinyl benzene and a mono-vinyl aryl compound.
5. A water-insoluble aminated polymerizate of a mixture comprising divinyl benzene and styrene.
6. A water-insoluble aminated polymerizate of a mixture comprising divinyl benzene and vinyl naphthalene.

7. A water-insoluble aminated polymerizate of a mixture comprising divinyl benzene and vinyl ethyl benzene.

8. A water-insoluble aminated polymerizate of a mass comprising a di-vinyl aryl compound.

9. A water-insoluble aminated polymerizate of a mass comprising divinyl benzene.

10. The method of treating liquid media to remove anions therefrom which comprises contacting such media with a water-insoluble aminated polymerizate of a poly-vinyl aryl compound, said polymerizate having anion exchange properties and being present in quantity sufficient to effect substantially complete removal of anions from said liquid media, and separating said polymerizate from the liquid media.

11. The method of treating liquid media to remove anions therefrom which comprises contacting such media with a water-insoluble aminated polymerizate of a mixture comprising a poly-vinyl aryl compound and a mono-vinyl aryl compound, said polymerizate having anion exchange properties and being present in quantity sufficient to effect substantially complete removal of anions from said liquid media, and separating said polymerizate from the liquid media.

12. The method of treating liquid media to remove anions therefrom which comprises contacting such media with a water-insoluble aminated polymerizate of a mixture comprising a di-vinyl aryl compound and a mono-vinyl aryl compound, said polymerizate having anion exchange properties and being present in quantity sufficient to effect substantially complete removal of anions from said liquid media, and separating said polymerizate from the liquid media.

13. The method of treating liquid media to remove anions therefrom which comprises contacting such media with a water-insoluble aminated polymerizate of a di-vinyl aryl compound, said polymerizate having anion exchange properties and being present in quantity sufficient to effect substantially complete removal of anions from said liquid media, and separating said polymerizate from the liquid media.

14. The method of treating liquid media to remove anions therefrom which comprises contacting such media with a water-insoluble aminated polymerizate of divinyl benzene, said polymerizate having anion exchange properties and being present in quantity sufficient to effect substantially complete removal of anions from said liquid media, and separating said polymerizate from the liquid media.

15. The method of treating liquid media to remove anions therefrom which comprises contacting such media with a water-insoluble aminated polymerizate of divinyl benzene and styrene, said polymerizate having anion exchange properties and being present in quantity sufficient to effect substantially complete removal of anions from said liquid media, and separating said polymerizate from the liquid media.

16. The method of treating aqueous media to remove anions therefrom which comprises percolating such media through a water-insoluble aminated polymerizate of divinyl benzene and styrene, said polymerizate having anion exchange properties and being present in quantity sufficient to effect substantially complete removal of anions from the aqueous media.

17. The method of treating liquid media to remove anions therefrom which comprises depositing on an inert carrier a surface coating of a water-insoluble aminated polymerizate of divinyl benzene and styrene having anion exchange properties, and contacting a liquid medium containing anions with the treated carrier to remove the anions from the liquid medium, said treated carrier containing a quantity of said polymerizate sufficient to effect substantially complete removal of the anions from said liquid medium, and separating the treated carrier from the liquid medium after treatment of the liquid medium therewith.

GAETANO F. D'ALELIO.